Patented June 8, 1943

2,321,270

UNITED STATES PATENT OFFICE 2,321,270

AQUEOUS THICKENING SOLUTIONS

Kenneth D. Bacon and George K. Greminger, Jr., Midland, Mich., assignors to The Dow Chemical Company, Midland, Mich., a corporation of Michigan No Drawing. Application May 23, 1941,
Serial No. 394,797

8 Claims. (Cl. 106—194)

This invention relates to a method of increasing the viscosity of an aqueous solution of a water soluble cellulose ether. The invention relates further to the preparation of novel and useful thickening solutions.

The various water soluble cellulose ethers have often been proposed as thickeners for aqueous solutions and, for this purpose, particularly high viscosity grades of the ethers are manufactured by special processes. There is, however, a practical upper limit to the intrinsic viscosity of cellulose ether which is capable of forming smooth gel-free solutions in water. If the cellulose employed in the manufacture of the ether is one which has been subjected to any appreciable chemical purification or treatment, known methods do not produce conveniently a water soluble cellulose ether whose aqueous solutions have as high a viscosity as solutions of equal concentration of some of the commonly available more viscous types of natural gums. The water soluble cellulose ethers, however, offer some advantage over the natural gums, provided that solutions of sufficiently high viscosity can be obtained.

It is, accordingly, an object of the invention to provide a means of increasing the viscosity of aqueous solutions of water soluble cellulose ethers. Another object is to provide a simple method whereby aqueous cellulose ether solutions of moderate or low viscosity may be converted into clear, smooth, gel-free solutions of high viscosity. It is a further object to prepare from water soluble alkyl and hydroxy alkyl ethers of cellulose aqueous solutions having viscosities comparable with those of solutions of the more highly viscous natural gums of equivalent concentration.

According to the present invention the foregoing and related objects are attained by the addition to aqueous solutions of the alkyl or the hydroxy alkyl ethers of cellulose of a compound or a mixture of compounds selected from the class consisting of the water soluble metal polysulfonates of alkylated hydroxy diphenyl. Compounds of this class may be made by the alkylation and subsequent polysulfonation of phenyl-phenols and the conversion by known methods of such sulfonated derivatives into their water soluble metal salts. The preparation of some of the compounds which have been found suitable for the present purpose is described in U. S. Patent No. 2,135,978. An example of a commercial product which is suitable for use in the present invention is the wetting agent known as "Aresklene." This material is a paste said to comprise a mixture of the dibutyl phenyl-phenol sodium disulfonates. Other suitable agents for use according to the invention are monobutyl phenyl-phenol sodium disulfonate, diethyl phenyl-phenol sodium disulfonate, monoamyl phenyl-phenol sodium disulfonate, monomethyl phenyl-phenol sodium trisulfonate, and the like.

In carrying out the invention a compound of the above defined class is dissolved in an aqueous solution of a water soluble alkyl or hydroxy alkyl ether of cellulose and an immediate increase in the viscosity of the aqueous solution is observed. Addition of the sulfonated compound is continued until the desired viscosity increase is obtained.

The water soluble cellulose ethers here concerned are the water soluble alkyl and hydroxy alkyl cellulose ethers. It has been found that the viscosity of aqueous solutions of the water soluble salts of carboxy alkyl ethers of cellulose, such as sodium cellulose glycolate, is relatively unaffected by the addition of even large amounts of alkyl phenyl-phenol sodium polysulfonates. Examples of the known water soluble alkyl and hydroxy alkyl ethers of cellulose include methyl cellulose, lowly substituted ethyl cellulose, hydroxy ethyl cellulose and hydroxy propyl cellulose. The thickened aqueous solutions made according to the method of the present invention are useful as thickeners in making various pharmaceutical or cosmetic preparations, for example, or for thickening the aqueous phase of coating or printing emulsions or to improve the ability of such emulsions to retain their pigment or filler in suspension.

The following examples illustrate the practice of the invention.

*Example 1*

To 100 parts by weight of a clear gel-free 2 per cent solution of methyl cellulose in water was added 1 part by weight of Aresklene. The viscosity of the methyl cellulose solution before addition of the stated sulfonate was 46 centipoises. After addition and solution of the sulfonate the viscosity had risen to 525 centipoises.

*Example 2*

It was desired to employ a methyl cellulose solution in water as a substitute for a previously employed 2 per cent solution of karaya gum. The gum solution formerly employed had a viscosity of 6000 centipoises. The methyl cellulose intended as a substitute for the gum formed 2 per cent aqueous solutions having a viscosity of 420 centipoises. It was found that these solutions could be adjusted to a 6000 centipoise viscosity by adding thereto 0.6 part by weight of Aresklene for each 100 parts by weight of the 2 per cent methyl cellulose solution.

Similar thickening results are obtained whenever a water soluble metal polysulfonate of an alkylated hydroxy diphenyl is employed in place of the specific member of the group recited in the examples. In general the alkyl groups contain not to exceed 10 carbon atoms, and the desired results are usually obtained when using from 0.1 to 2 per cent of the sulfonate, based on the weight of the aqueous solution to which it is added. The hydroxy diphenyl from which the compounds are made can apparently be any of the isomeric phenyl-phenols or mixtures thereof. The same thickening effect is observed whether the water soluble cellulose ether is a water soluble form of methyl cellulose or of ethyl cellulose or hydroxy ethyl cellulose.

The thickening effect of the herein recited alkyl phenyl-phenol polysulfonates appears to be rather specific, since numerous other commercially available wetting agents have been tested and found to give at best but a fraction of the viscosity increase obtained when the preferred and herein recited agent is employed. The following table illustrates the advantages accruing to the preferred compounds as contrasted to the relatively minor thickening effect obtainable from other wetting agents. In each case 1 part of the wetting agent was added to 100 parts of a 2 per cent solution of methyl cellulose in water. Viscosity measurements were all made at 25° C.

*Table*

| Wetting agent | | Viscosity of solution in centipoises |
|---|---|---|
| Trade name | Chemical nature [1] | |
| None | | 46 |
| Aresklene | Dibutyl phenyl-phenol sodium disulfonate | 525 |
| Duponal M E | Sodium lauryl sulfate | 293 |
| Soap | Sodium stearate | 247 |
| Santomerse 3 | Substituted aromatic sulfonate | 188 |
| Tensol | A sulfonated ether | 108 |
| Alkanol B | Sodium alkyl naphthalene sulfonate | 95.3 |
| | Ammonium laurate | 72.2 |
| Areskap 50 | Sodium monosulfonate of butyl phenyl-phenol | 73.5 |
| Aerosol OT | Dioctyl ester of sodium sulfo succinate | 68 |
| Triton 518 | Quaternary ammonium salt | 67 |

[1] Cupples, U. S. Dept. of Agriculture, Bureau of Entomology and Plant Quarantine, Div. of Insecticide Investigations, Bulletin E-504, June 1940.

All of the wetting agents reported are seen to affect the viscosity of the methyl cellulose solutions, but no wetting agents were found to give such a high degree of viscosity increase as that resulting from the use of alkyl phenyl-phenol polysulfonates, particularly the disulfonates. Many of the agents tested contribute no more than the expected additional viscosity due to the higher concentration of solute in the final solutions. The preferred compounds contribute about an 80 per cent viscosity increase over the viscosity of solutions containing the next most effective agent for the purpose, in the concentrations reported.

We claim:

1. An aqueous solution comprising a water soluble cellulose ether selected from the class consisting of the water soluble alkyl celluloses and water soluble hydroxy alkyl celluloses, and, as a thickening agent therefor, a water soluble metal salt of an alkylated phenyl-phenol polysulfonate wherein the alkyl group contains less than 10 carbon atoms.

2. An aqueous solution comprising a water soluble cellulose ether selected from the class consisting of the water soluble alkyl celluloses and water soluble hydroxy alkyl celluloses, and, as a thickening agent therefor, a water soluble sodium salt of an alkylated phenyl-phenol disulfonate, wherein the alkyl group contains less than 10 carbon atoms.

3. An aqueous solution comprising a water soluble cellulose ether selected from the class consisting of the water soluble alkyl celluloses and water soluble hydroxy alkyl cellulose, and, as a thickening agent therefor, a water soluble sodium salt of a butylated phenyl-phenol disulfonate.

4. An aqueous solution comprising a water soluble methyl cellulose, and, as a thickening agent therefor, a water soluble sodium salt of a butylated phenyl-phenol disulfonate.

5. An aqueous solution comprising a water soluble methyl cellulose, and, as a thickening agent therefor, a water soluble sodium salt of a dibutyl phenyl-phenol disulfonate.

6. An aqueous solution comprising about 2 per cent of water soluble methyl cellulose, and, as a thickening agent therefor, from 0.1 to 2 per cent of a water soluble sodium salt of a dibutyl phenyl-phenol disulfonate.

7. An aqueous solution comprising a water soluble hydroxy ethyl cellulose, and, as a thickening agent therefor, a water soluble sodium salt of a butylated phenyl-phenol disulfonate.

8. An aqueous solution comprising a water soluble hydroxy ethyl cellulose, and, as a thickening agent therefor, a water soluble sodium salt of a dibutyl phenyl phenol disulfonate.

KENNETH D. BACON.
GEORGE K. GREMINGER, Jr.